United States Patent
Gorman et al.

(10) Patent No.: US 9,069,811 B2
(45) Date of Patent: *Jun. 30, 2015

(54) METHOD FOR BUILDING AND MAINTAINING TRUSTED SUPPLIER RECORDS

(71) Applicant: INTERNATIONAL BUSINESS MACHINES CORPORATION, Armonk, NY (US)

(72) Inventors: Michael Gorman, Ashburn, VA (US); Gregory Iaquinto, Jr., Burlington, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/860,956

(22) Filed: Apr. 11, 2013

(65) Prior Publication Data

US 2013/0282651 A1 Oct. 24, 2013

Related U.S. Application Data

(63) Continuation of application No. 13/360,922, filed on Jan. 30, 2012.

(51) Int. Cl.
| | | |
|---|---|---|
| *G06F 17/30* | (2006.01) | |
| *G06F 17/00* | (2006.01) | |
| *G06F 12/02* | (2006.01) | |
| *G06F 12/08* | (2006.01) | |
| *G06Q 10/06* | (2012.01) | |
| *G06Q 10/10* | (2012.01) | |

(52) U.S. Cl.
CPC .......... *G06F 17/30345* (2013.01); *G06Q 10/06* (2013.01); *G06Q 10/10* (2013.01)

(58) Field of Classification Search
CPC ............ G06F 21/6218; G06F 9/45533; G06F 9/45558; G06F 21/53; G06F 3/067; G06F 2221/2143; G06F 3/0665; G06F 3/0689; G06F 21/88; G06F 2221/2149; G06F 21/41; G06F 3/0604; G06F 3/0619; G06F 9/543; G06F 2009/45562; G06F 2009/45579; G06F 21/604

See application file for complete search history.

(56) References Cited

U.S. PATENT DOCUMENTS

| | | | | |
|---|---|---|---|---|
| 5,933,498 | A * | 8/1999 | Schneck et al. | 705/54 |
| 6,009,526 | A * | 12/1999 | Choi | 726/1 |
| 6,023,762 | A * | 2/2000 | Dean et al. | 713/193 |
| 7,353,497 | B2 | 4/2008 | Maresca et al. | |
| 7,496,588 | B2 * | 2/2009 | Wong et al. | 707/999.009 |

(Continued)

OTHER PUBLICATIONS

MOL Hungarian Oil and Gas PLC., MOL Supplier Qualification System, three pages (No Date Provided).

*Primary Examiner* — Yicun Wu
(74) *Attorney, Agent, or Firm* — Moore & Van Allen PLLC (57) ABSTRACT

An Enterprise Network includes a master data management (MDM) system that is linked to two or more data sources each of which include means for storing local management information. The MDM system builds a master management information database that is comprised of some or all of the management information stored by the data sources. The master database in the MDM includes master records each of which is comprised of one or more attributes. The MDM system is configured to only update particular master record attributes with selected management information received from a trusted data source.

29 Claims, 7 Drawing Sheets

(56) References Cited

U.S. PATENT DOCUMENTS

| | | | |
|---|---|---|---|
| 7,509,326 B2* | 3/2009 | Krabel et al. | 707/999.1 |
| 7,590,987 B2 | 9/2009 | Behrendt et al. | |
| 8,166,048 B2* | 4/2012 | Wong et al. | 707/748 |
| 8,271,477 B2* | 9/2012 | Sood et al. | 707/713 |
| 8,341,131 B2* | 12/2012 | Cohen | 707/694 |
| 8,458,148 B2* | 6/2013 | Tahiliani et al. | 707/694 |
| 2004/0093330 A1* | 5/2004 | Westphal | 707/3 |
| 2004/0243640 A1* | 12/2004 | Bostleman et al. | 707/104.1 |
| 2008/0052310 A1* | 2/2008 | Rangadass | 707/102 |
| 2008/0060080 A1* | 3/2008 | Lim | 726/26 |
| 2009/0287837 A1* | 11/2009 | Felsher | 709/229 |
| 2009/0287868 A1* | 11/2009 | Lee | 710/110 |
| 2010/0241895 A1* | 9/2010 | Li et al. | 714/4 |

* cited by examiner

METHOD FOR BUILDING AND MAINTAINING TRUSTED SUPPLIER RECORDS

CROSS-REFERENCE TO RELATED APPLICATIONS

This application is a continuation of U.S. patent application Ser. No. 13/360,922, filed on Jan. 30, 2012, and is hereby incorporated herein in its entirety by reference.

BACKGROUND

1. Field of the Invention

The present disclosure relates generally to systems that maintain information in the form of a master data record, and specifically to data records that are compiled from trusted data sources.

2. Background

Legal entities such as private or public corporations (referred to herein as an Enterprise) typically need to gather and maintain a store of information or data that serves to support their business activities. In this context, business activities can include such things as sales, marketing, manufacturing, procurement activities and other activities, and this information or data is typically referred to as management information. This management information is typically stored at a location within the Enterprise that allows it to be easily maintained and quickly accessible by individuals or systems which can be located at that location or at a remote location within the Enterprise. Depending upon the size of an Enterprise, the number of locations in which management information is stored can become quite large. Typically, for an Enterprise to conduct its business in a consistent manner, it is beneficial that separate instances of similar management information maintained at different locations within the Enterprise be substantially the same. However, as the number of management information storage locations within an Enterprise and external to the Enterprise grow, the probability increases that each instance of similar management information can include data that does not match that which is stored at the other locations (i.e., each instance is not homogeneous). One cause leading to dissimilarity between management information records can be that the information for each record is received from different data sources. Another cause leading to dissimilarity between management information records is related to these records being built by different systems using different schemas. Each of the locations in which management information is stored or received from is referred to herein as a management information/data source or simply a data source (DS), and a DS can be an Enterprise Resource Planning (ERP) system, a server with associated computer storage medium, a personal computer, a subscription data source external to the Enterprise network but to which the Enterprise subscribes, or any source of management information internal or external to the Enterprise Network. The management information stored in some or all of the data sources is typically accessible by individuals working for the Enterprise or devices operating in the Enterprise to perform certain tasks such as the procurement of materials to support the manufacturing process or other processes.

Figure 1:
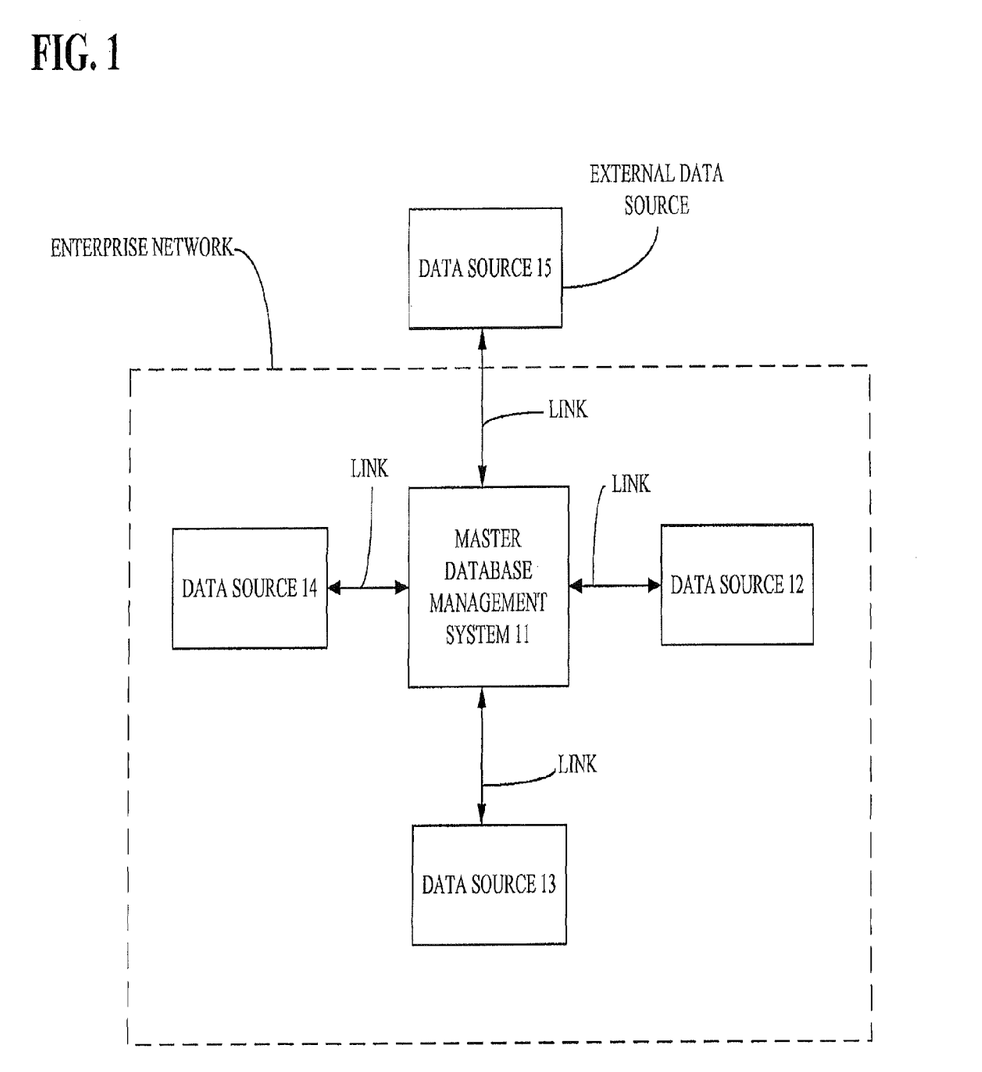
FIG. 1 is an illustration of an Enterprise Network

In order to mitigate the problems associated with maintaining separate but similar stores of management information at different locations, an Enterprise can build and maintain a single, master repository of management information, and such a repository is typically referred to as a Master Database. A Master Data Management (MDM) system is typically employed by the Enterprise to build and maintain the master database. A MDM system generally operates to build a master database using management information that it receives (pulls) from data sources that are in communication with the MDM over the enterprise network, or any other type of local or wide area network employed by a corporation to distribute management information. The MDM system can also push management information to data sources with which it is connected. The master database typically includes a plurality of master records, each one of which can include information that is used to support any one of the corporation's activities, such as a procurement activity. In this case, a master record can be comprised of information relating to a particular supplier, and it can be built using supplier information received by the MDM system from one or more data sources with which it is in communication over the enterprise network. FIG. 1 illustrates an Enterprise Network 10 that is comprised of a MDM system 11 and four DS s, DS.12-DS.15. In the context of FIG. 1, DS.15 represents an external data source (e.g., Equifax or Dunn & Bradstreet) located outside the Enterprise Network to which the MDM can subscribe to receive management information, DS.12 can represent an ERP system operating in support of an Enterprise financial operation, DS.13 can be a personal computer device running a business application that is used by a particular individual working for the Enterprise, and DS.14 can be another ERP system operating in support of an Enterprise business unit (such as sales or manufacturing). Some or all of the data sources can communicate with the MDM via the same or different communication protocols. So, for instance, DS.12 can communicate over a wide area network link (e.g., IP) using the well know File Transport Protocol (FTP), DS.13 can communication over a local area network link (e.g., Ethernet) and so forth. In operation, the MDM 11 can periodically request or receive and store management information from any of the four data sources DS.12-DS.15, and this stored management information can be made available to individuals or systems in the Enterprise with permission to access the information. For instance, MDM 11 can receive financial management information from data source DS.12, and it can receive supplier management information from data source DS.15.

BRIEF DESCRIPTION OF THE DRAWINGS

The present invention can be best understood by reading the specification with reference to the following Figures, in which.

DETAILED DESCRIPTION

As described earlier in the background section, Master Data Management (MDM) systems can be used to compile a single, Enterprise-wide, master database of management information. The master database typically includes a plurality of master records, and each master record can include management information received from one or more source records maintained by the MDM system. This management information comprising a source and master record can include, but is not limited to, such things as the name, address and contact information of a supplier, credit rating, financial information, and the type of product of service the supplier provides to name only a few, and each category of management information is referred to here as an attribute. Each one of the source records is dedicated to storing management information received by the MDM system from a particular data source, and any two or more source records can include similar management information, as different data sources can provide the MDM system with similar management information.

As described above, two or more source records can be created and maintained in a MDM system that include management information corresponding to a common supplier, and the management information maintained in the two or more source records can be used to build a master record. In the event that similar management information is included in two or more source records stored on the MDM system, the system necessarily determines which management information included in the two or more source records to use when building and/or maintaining a master record. The process by which a MDM system can select one instance of management information from among several instance of management information is typically referred to as attribute cleansing. However, the prior art attribute cleansing techniques do not take into consideration the reliability or accuracy of the information received from each data source, and these techniques do not take into consideration the geographic location of the MDM system within an Enterprise System when receiving information for promotion to a master record.

Accordingly, it is desirable if a Master Database Management (MDM) system can to build a master database comprising one or more master records, wherein management information included in at least one attribute comprising at least one of the master records is received by the MDM system from a selected data source that includes trusted management information. In one embodiment, a data source is selected and the MDM system is configured to only populate particular master record attributes with management information received from data sources specifically selected to provide the management information. A master database record built in this manner can be relied upon to only store trusted, reliable, and up-to-date information corresponding to each supplier, and such a database record is referred to herein as a trusted master database record (TMDR). According to another embodiment, one or more data sources can be selected to provide management information to a particular master record according to a rule or a set of rules. In another embodiment, the automatic population/promotion of management information to an attribute of a selected master record can to manually overridden. In another embodiment, a data source operating within the Enterprise Network can subscribe to receive management information relating to a particular attribute associated with a selected master record.

Figure 2:
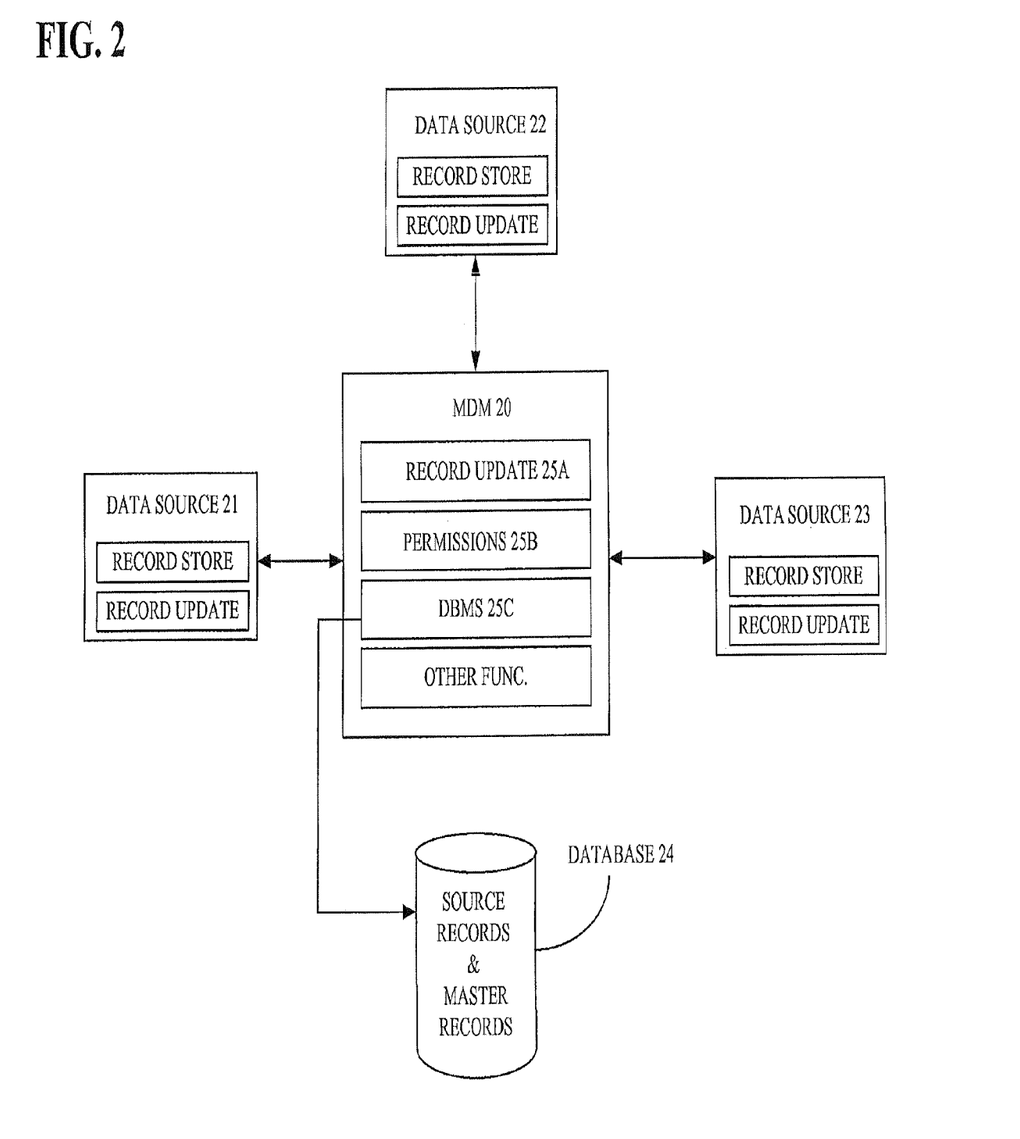
FIG. 2 is a high-level diagram of an MDM with connections to Enterprise Network devices.

FIG. 2 is a high level diagram showing functional elements that can comprise a generic master database management (MDM) system 20. The MDM system 20 is connected, in this case, over one or more links with three data sources (DS21-DS23), some or all of which operate within an Enterprise Network) and to a store of source and master records in a database 24. The MDM system 20 includes record update functionality 25A, security or permission rules 25B, a database management system 25C and other functional elements necessary for the proper operation of the MDM system 20. The record update functionality 25A generally operates to receive management information from any one of the three data sources, DS21-DS23, detect a unique identifier associated with the received management information and compare this to a store of unique identifiers, store the received information in the database 24 as one or more source records, map the source records to master records also stored in the database 24, and to periodically promote information comprising a source record to the master record to which it maps. Mapping between the source and the master records can be accomplished using any one of a number of well know techniques (i.e., fuzzy matching) and so will not be described here in any detail.

The permissions 25B in FIG. 2 can include rules, security procedures or similar database access control functionality that restricts access to the DMD 20 to only those individuals or systems that are registered with the DMD 20. A MDM system 20 Steward typically is assigned the highest permission, which can include access to all of the master records and permission to modify the format and data included in the records. The DBMS 25C generally operates to populate the Master Records stored in the database 24 with management information according to a schema specified by the Enterprise. Other MDM system 20 functionality can be included to provide optional or other functionality, but will not be described here in detail as the design and operation of MDM system is generally well know to those skilled in the art.

Figure 3:
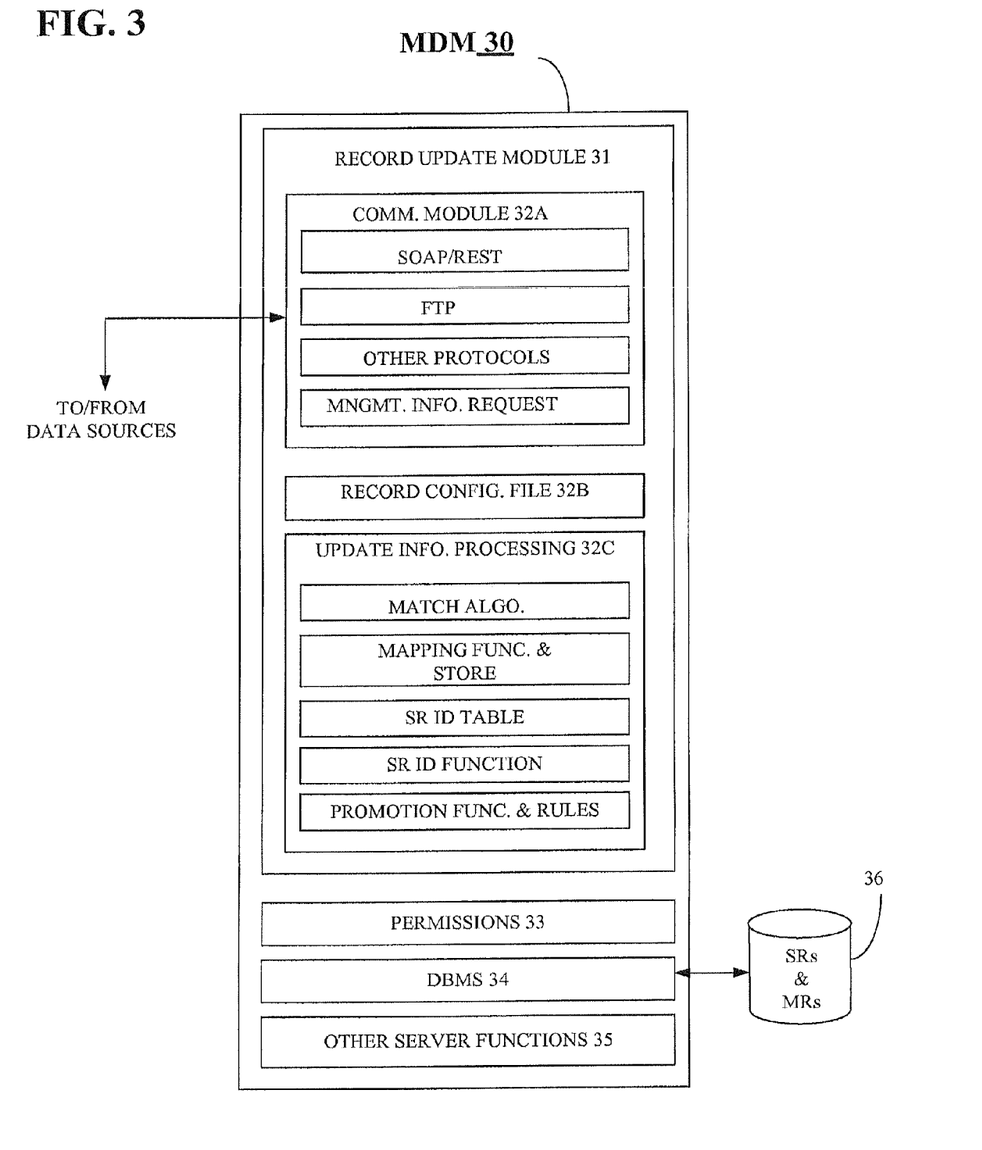
FIG. 3 is a block diagram of functionality comprising an embodiment of an MDM.

FIG. 3 is a diagram showing functional elements that can comprise one embodiment of a MDM system 30. The MDM system 30 (or simply MDM 30) is comprised of functionality that can be stored on or in association with a network server, or any type of computational device connectable to a network, and the MDM 30 functionality can be run by one or more processing devices comprising the network server. In contrast to the MDM system 20 described with reference to FIG. 2, MDM 30 includes improved master record update functionality that permits a data Steward to specify which of among two or more similar instances of management information, each stored in a separate source record, are promoted to a master record. In this regard, the Steward can specify a data source that provides the most up-to-date and trusted management information, or the Steward can specify a data source based on a rule or a set of rules. The MDM 30 of FIG. 3 is comprised of a database record update module 31, a permissions module 33, a database management system (DBMS) 34 and associated computer readable storage medium (database) 36, and other functionality necessary for the MDM 30 to operate such as standard network server functionality. The MDM 30 is typically in communication with one or more data sources located within or outside an Enterprise Network. These data sources can be similar to those described earlier with reference to FIG. 1 and FIG. 2. The storage medium 36 comprises a plurality of source records and a plurality of master records.

Continuing to refer to FIG. 3, the record update module 31 is comprised of a communication module 32A, a database record configuration module 32B and an update information processing module 32C. The communication module 32A can include any computer software, firmware or hardware necessary to support communications between the MDM 30 and any of the data sources with which it is linked. The module 32A can be configured to support network communication over links operating according to the Internet Protocol (IP), the File Transport Protocol (FTP), the Simple Object Access Protocol (SOAP) or any other appropriate standard or non-standard network communication protocol. The communication module 32A can also include functionality that is configured to periodically formulate and transmit requests for management information from data sources. Management information received from each of the data sources in response to a request is stored in a separate MDM source record identified by a unique source record identifier (typically generated by the data source). If the unique source record identifier matches one that is already stored on the MDM 30, (i.e., a source record associated this identity already exists), then the MDM 30 can update the existing source record with the management information received from the data source. otherwise the MDM 30 can create a new source record in which to store the management information. Management information included in a source record can be used to update a master record stored in the database 36.

The record configuration module 32B shown with reference to FIG. 3 according to an embodiment of the invention stores a correspondence between selected source record attributes and selected master record attributes stored in the database 36. More specifically, at the time a master record is created, a data Steward can determine that selected master record attributes should only be populated with management information received by the MDM 30 from selected data sources. Knowing which of the source records are comprised of management information received from a particular data source, the data Steward can determine which of the data sources can be trusted to provide the best management information, and select this source record to provide management information to a master record according to the configured correspondence stored in the file 32B. This correspondence can be configured/assigned by a MDM 30 Steward or any individual who is permitted to configure the mapping between a data source and a record attribute. This correspondence between master record attributes and source record attributes is described in more detail later with reference to FIG. 6.

Referring now to the update management information processing module 32C of FIG. 3. This module 32C is comprised of a matching algorithm, a source record to master record mapping function and mapping store, a table for storing the unique source record identities, unique identity detection and comparison functionality, and promotion functionality and promotion rules. Although the embodiment described here is implemented with a separate source record ID table, another embodiment can include the source record ID information in each source record. Assuming that the MDM 30 determines that a source record is not already mapped to a master record, the module 32C can employ the data matching algorithm to compare information included in a source record to information included in each master record. In this regard, information comprising each attribute in a source record is compared to information stored in each/all master record(s) to determine whether the source record can or cannot be mapped to a master record. More specifically, the matching algorithm can score the results of this comparison, and each score is an indication of the probability that a source record can be mapped to a master record. The probability can be expressed in a percentage, an integer, or any other appropriate method. In operation, if the comparison between one source record and the master records to which it is compared results in only one score (one source record to one master record match probability) that is greater than or equal to a first specified threshold value, the MDM 30 determines that there is a correspondence between this source record information and the master record information, and maps this source record to the master record and stores this correspondence in the mapping store. If the results of this mapping function indicate that a source record can be mapped to more than one master record (running the matching algorithm results in two or more scores that are greater than or equal to the first threshold value), then the MDM 30 may not be able to automatically determine which master record the source record maps to, and the mapping can be performed manually by a Steward. On the other hand, if no matches are identified or if the value of one or more scores are all less than a second specified threshold value (which is of value representing a lower match probability between a source and master record; i.e., a lower percentage), the MDM 30 can determine that this management information does not exist in a master record and a new master record is created, and the source record which is being operated on is mapped to this newly created master record. This data matching algorithm can be implemented in a fuzzy matching algorithm or it can be implemented in any one or several other data matching techniques, as described above. The update management information processing module 32C can also include a mapping function that can be employed by a MDM data Steward to map relationships between master record attributes and data sources selected by the Steward to provide management information with which to populate the attributes. The result of this mapping can be stored in the record configuration file 32B described above.

Continuing to refer to FIG. 3, the promotion function generally operates in conjunction with information included in the record configuration file 32B to determine which source record management information is promoted to a corresponding master record. More specifically, the promotion function uses the correspondence information stored in the configuration file 32B to determine which source record to select management information from when promoting this information to a master record. Alternatively, the promotion functionality can be included in the DBMS 14. If it is, then the DBMS is responsible for populating the database 36 with the management information included in the appropriate source record. In an alternative embodiment, if more than one data source located within or outside the Enterprise Network includes similar management information, management information received from each data source can be prioritized with respect to promotion to a particular master record attribute. For instance, if supplier A is located in the United States, and supplier B is located in Europe, then it may be desirable to receive supplier A financials from a data source located in the U.S. and to receive supplier B financials from a data source in Europe. In this regard the promotion function in the processing module 32C can include promotion rules or rule sets. A rule or rule set can be defined by a qualifying expression, such as: if supplier B is located geographically in the United States, then only promote management information to master record X which is received and stored in source record X from a particular data source, such as Equifax. In this manner, the MDM 30 can be configured to only promote management information stored in a source record if it is received from a primary data source.

It should be understood that while the record configuration file 32B is illustrated in FIG. 3 as being located in the record update module 31, the configuration information comprising the file 32B can be stored in any computer readable medium accessible by the DBMS, whether the medium is directly or indirectly accessible to the MDM 30 or not. The configuration information comprising file 32B can be stored with the database records in the storage device 36, this information can be stored in one or more dynamic or static memory devices associated with the MDM 30, or this information can be stored in a location within the Enterprise network that is remote to the MDM 30.

Figure 4:
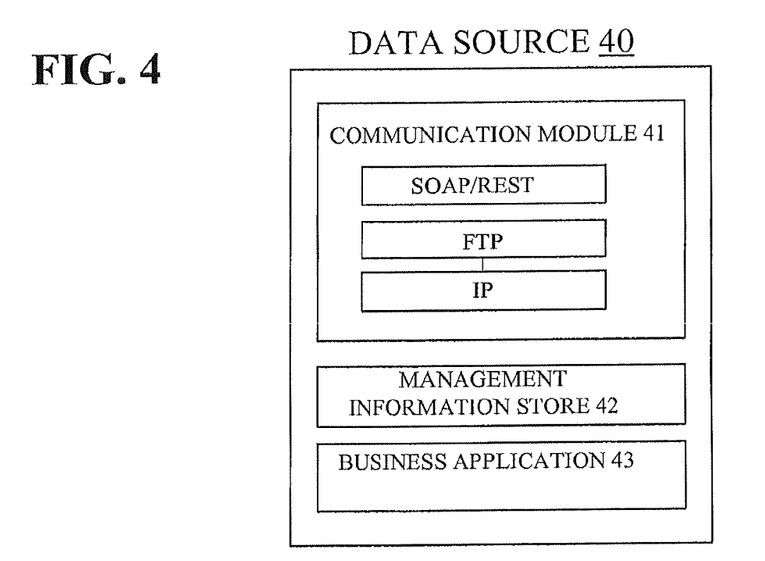
FIG. 4 is a block diagram of functionality comprising a data source.

FIG. 4 is a diagram showing functionality comprising a data source 40, such as the data sources DS21, DS22 and DS23 or FIG. 2. These data sources can be network devices operating in an Enterprise System or they can be network devices operating outside the Enterprise System such as a third party information service like Equifax or Dunn and Bradstreet. The data source 40 can be an ERP system, a network server, a business application running on a personal computer, or any other type of process that stores or processes business management information that is in communication with the MDM 30 of FIG. 3. The data source 40 can be comprised of a communication module 41, a management information store 42 and any one of a number of business applications (financial, sale, marketing, procurement, etc.). All of the functionality comprising the data source 40 is described earlier with reference to FIG. 2 and FIG. 3 and so will not be describe here any further.

Figure 5:
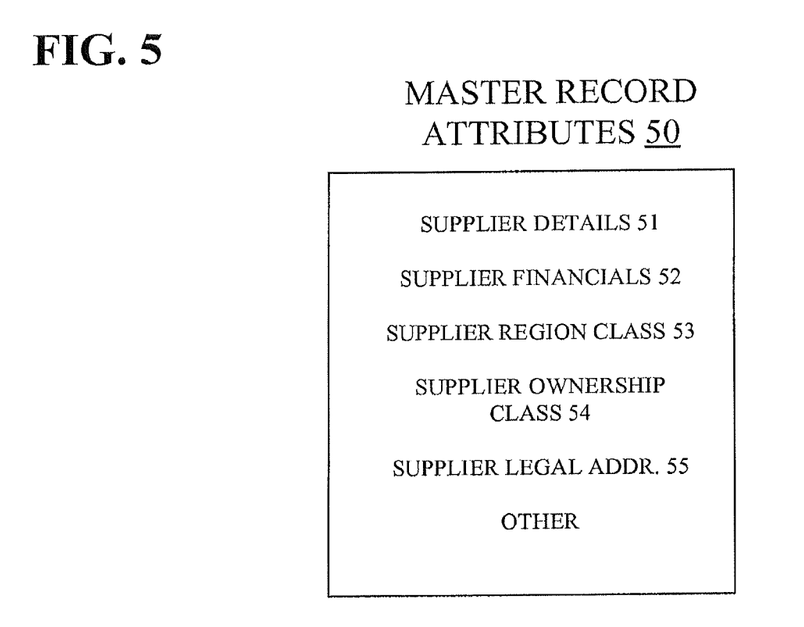
FIG. 5 is a diagram of the format of a Master Record.

FIG. 5 is a listing 50 of the different attributes that can comprise a master management information record maintained by the MDM 30 in the master database 36. It should be understood that the listing of attributes for any particular master record can include more or fewer attributes than those listed in FIG. 5. The supplier detail attributes 51 can include such management information as the suppliers legal name, any alias's, the business type, the address of any website associated with the business, a description of the business, the number of employees, the main business telephone number and other information. The supplier financial attributes 52 can include among other things such management information as annual sales, date the fiscal year ends, stock symbol, credit rating, and SEC filings. The remaining attributes, the region class attributes 53, the ownership class attributes 54 and the legal address attributes 55 are not described here in detail as these attributes are well know to those in the business procurement area.

Figure 6:
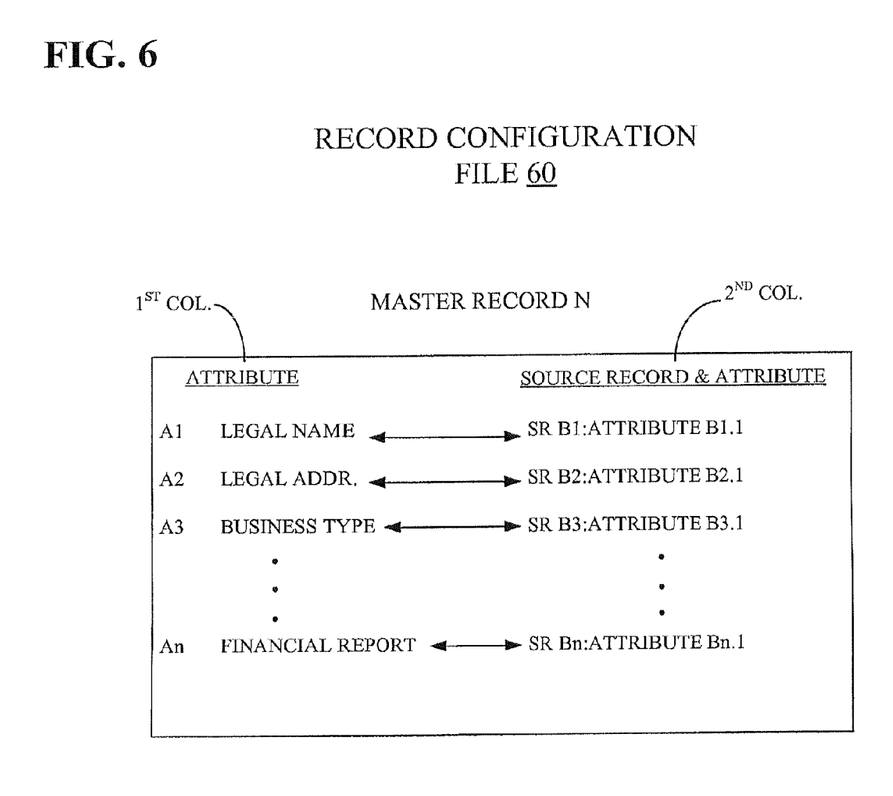
FIG. 6 is a diagram illustrating the format of a record configuration file.

The record configuration file 32B described earlier with reference to FIG. 3 is described below with reference to FIG. 6. Each master record stored in the database 36 is comprised of one or more attributes, and each master record attribute is populated with management information in accordance with the source record to master record correspondence configured and stored in the file 32B. Referring to FIG. 6, a master record "N" is shown which is comprised of attributes A1-An, in a first column, with each attribute configured to receive management information from a selected source record identified in a second column. The second column includes the identity of a source record and the identity of an attribute associated with the source record. This information is presented in the file 60 as a source record-attribute pair. In this case, attribute A.1 in master record N includes the legal name of the supplier associated with this master record, and this attribute A1 is configured to receive management information (legal name information) store in a selected source record Bland a particular attribute B1.1 associate with a selected source record. Each of the attributes, A.1 to A.n, comprising the master record N can be configured to receive management information from different source records or from the same source record. The master record to source record configuration is largely dependent upon the accuracy of the management information that a data source stores provides, or the timeliness with which the management information can be transmitted to the MDM 30.

Figure 7A:
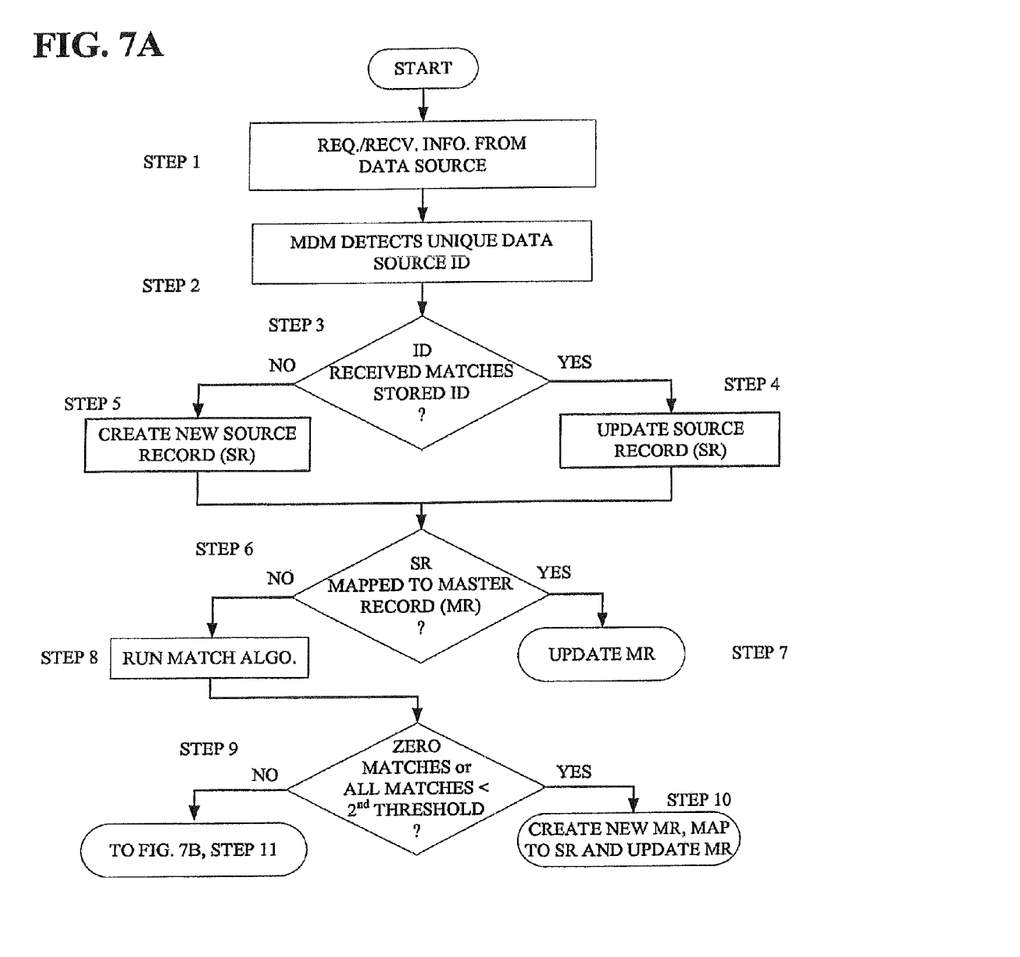
FIG. 7A is a logical flow diagram of the master record update process according to one embodiment of the invention.
Figure 7B:
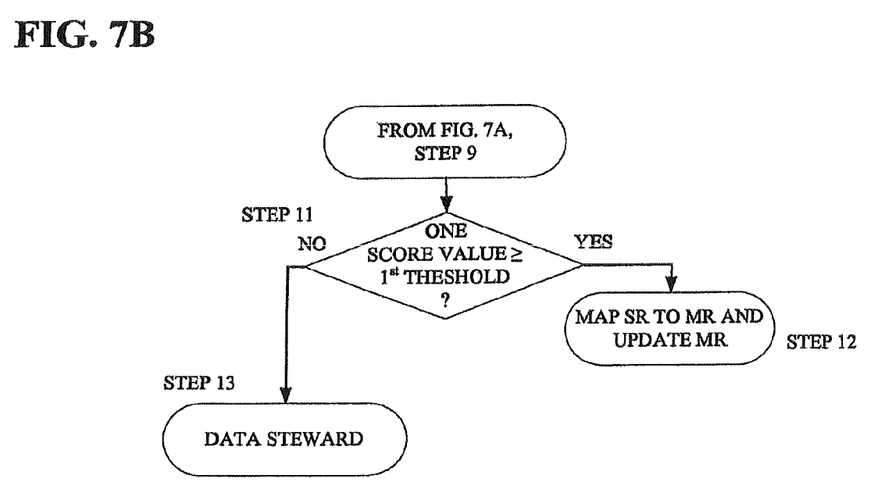
FIG. 7B is a continuation of the logical flow diagram of FIG. 7A.

The processes by which a management information master record (master record) is maintained will now be described with reference to FIG. 7. For the purpose of this description, it is assumed that a master record "N" has already been created by a MDM system, that the master record includes some number of attributes, and that the attributes are populated with management information promoted to it from one or more source records. FIG. 7 illustrates, and the corresponding description describes, a process wherein the MDM system pulls (requests) management information from a data source or wherein a data source pushes (MDM receives) management information to the MDM.

Referring now to Step 1 in FIG. 7, a MDM system, such as the system 30 described with reference to FIG. 3, periodically formulates and sends a message to one or to all of the data sources connected to an Enterprise Network in which it operates requesting that management information stored by the data source be transmitted to the system 30. The message can include a general request for management information from each of the data sources, or the request can identify one or more files stored in one or more of the data sources for transfer to the MDM 30.

In Step 2, if the MDM system receives the requested information, the unique data source ID detection function examines the received management information for a unique data source ID, and compares the ID received with the management information from the data source to a store of source record IDs. If in Step 3 there is a match between the received ID and the stored ID, then the process proceeds to Step 4 and the corresponding source record is updated with the received management information. On the other hand, if the received ID does not match a stored IDs, then in Step 5 the MDM system (DBMS) creates a new source record and stores the received management information in this record. After the received management information is stored in either an existing source record or a newly created source record, the process proceeds to Step 6 where the mapping function determines whether or not the source record in Step 4 or Step 5 is mapped to a master record. If the source record is mapped to a master record, then in Step 7 the master record is updated with at least some of the management information then stored in the source record. Specifically, and according to one embodiment, the promotion function uses information in the configuration file 32B to determine that management information stored in one or more attributes associated with the source record is promoted to the master record. So for instance, if the file 32B is configured with a correspondence between a first attribute of a particular source record and a particular master record, then the management information comprising the first attribute is promoted to the master record. On the other hand, if in Step 6 it is determined that the source record is not mapped to a master record, the process proceeds to Step 8 and the MDM system runs the matching algorithm. In Step 9, the results of the results of Step 8 are examined, and if no matches between the source record and the master records stored by the MDM system are identified, or if the value of a score for all matches between the source record and a master record are identified to be less than the second threshold value described earlier with reference to FIG. 3, the process proceeds to Step 10 and a new master record is created and populated with trusted management information stored in the source record. On the other hand, if in Step 9, one or more matches between the source record and the master records are identified, then the process proceeds to Step 11 in FIG. 7B.

Turning now to FIG. 7B, if in Step 11 the value of only one score resulting from running the matching algorithm is greater than or equal to a selected first threshold value (as between the source record and at least one master record), then the process proceeds to Step 12 where the mapping function configures a correspondence between the source record and the master record and the master record is updated accordingly. On the other hand, if in Step 11 more than one score value is greater than or equal to the selected first threshold value described earlier with reference to FIG. 3, then the process proceeds to Step 13. In Step 13 a data steward can be responsible for manually selecting a correspondence between the source record to one of the matching master records.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for updating a master record stored in a master data management (MDM) system running on a network server, comprising:
    configuring and storing a correspondence between the master record and a source record to which the master record is mapped that permits the master record to be updated with trusted management information stored in the source record;
    the MDM system receiving trusted management information from a trusted data source and storing the trusted management information in the source record, wherein receiving the trusted management information from the trusted data source comprises:
        receiving information from a data source;
        detecting a unique data source identification (ID) for the data source associated with the received information;
        comparing the unique data source ID to stored source record IDs;
        updating a particular source record corresponding to one of the stored source record IDs with the received information in response to a match between the unique data source ID and the one of the stored source record IDs; and
        creating a new source record in response to no match between the unique data source ID and the stored source record IDs and storing the received information in the new source record; and
    a processor in the network server executing master record update functionality comprising the MDM system to only update the master record with the trusted management information stored in the source record according to the stored correspondence between the master record and the source record.

2. The method of claim 1, further comprising the MDM system formulating and transmitting a management information request message to the trusted data source.

3. The method of claim 2, wherein the management information request message is formulated to request that all of the management information stored at the trusted data source is sent to the MDM system.

4. The method of claim 3, wherein the management information request message is formulated to request that selected one or more instances of management information are sent to the MDM system.

5. The method of claim 1, further comprising only updating the master record with trusted management information received from one of a plurality of trusted data sources according to one or more rules.

6. The method of claim 5, wherein the one or more rules each include a logical expression that qualifies management information comprising one of the plurality of data sources to be promoted to the master record.

7. The method of claim 1, wherein the correspondence configured between the source record and the master record is manually over-ridden.

8. The method of claim 1, further comprising that in the event the source record is not mapped to a master record, the MDM system compares the source record to at least one master record to identify a match.

9. The method of claim 8, wherein the comparison identifies two or more master records that match the source record.

10. The method of claim 9, wherein one of the two or more master records to which the source record matches is manually selected to be mapped to the source record.

11. The method of claim 1, wherein the correspondence configured between the source record and the master record defines at least one master record attribute comprising the master record to be updated with trusted management information stored in the source record.

12. The method of claim 11, wherein the source record is comprised of two or more attributes at least one of which includes trusted supplier management information.

13. The method of claim 12, wherein the trusted supplier management information is one of a legal supplier name, a legal supplier address, supplier financial information, supplier business type, supplier business description, number of employees, the mail phone number and a web site URL.

14. A method for updating a master record stored in a master data management (MDM) system running on a network server, comprising:
    configuring a correspondence between one or more attributes comprising the master record and two or more source records to which the master record is mapped, and storing the correspondence in the server in association with the MDM system;
    defining one or more rules for promoting trusted management information stored in one of the two or more source records to the master record;
    a processor operating in the network server using the configured correspondence between the one or more attributes comprising the master record and the two or more source records and the one or more defined rules to execute record update functionality comprising the MDM system to promote the trusted management information from one of the two or more source records to the one or more attributes comprising the master records;
    receiving information from a data source;
    detecting a unique data source identification (ID) for the data source associated with the received information;
    comparing the unique data source ID to stored source record IDs;
    updating a particular source record corresponding to one of the stored source record IDs with the received information in response to a match between the unique data source 1D and the one of the stored source record IDs; and creating a new source record in response to no match between the unique data source ID and the stored source record IDs and storing the received information in the new source record.

15. The method of claim 14, further comprising the MDM system formulating and transmitting a management information request message to a trusted data source.

16. The method of claim 15, wherein the management information request message is formulated to request that all of the management information stored at the trusted data source is sent to the MDM system.

17. The method of claim 15, wherein the management information request message is formulated to request that selected one or more instances of management information are sent to the MDM system.

18. The method of claim 14, wherein the one or more rules include a logical expression that qualifies management information comprising one of the plurality of data sources to be promoted to the master record.

19. The method of claim 14, wherein the correspondence configured between the source record and the master record is manually over-ridden as long as a management information value received from a trusted source is in error.

20. The method of claim 14, further comprising that in the event the source record is not mapped to a master record, the MDM system compares the source record to at least one master record to identify a match.

21. The method of claim 20, wherein the comparison identifies two or more master records that match the source record.

22. The method of claim 21, wherein one of the two or more master records to which the source record matches is manually selected to be mapped to the source record.

23. The method of claim 14, wherein the correspondence configured between the source record and the master record defines at least one master record attribute comprising the master record to be updated with trusted management information stored in the source record.

24. The method of claim 23, wherein the at least one master record attribute is comprised of supplier management information.

25. The method of claim 24, wherein the supplier management information is one of a legal supplier name, a legal supplier address, supplier financial information, supplier business type, supplier business description, number of employees, the mail phone number and a web site URL.

26. The method of claim 1, further comprising:
determining if a particular source record is mapped to a particular master record in response to storing or updating information in the particular source record; and
updating the particular master record with the information from the particular source record in response to the particular source record being mapped to the particular master record.

27. The method of claim 26, further comprising:
running a matching algorithm in response to the particular source record not being mapped to the particular master record;
mapping the particular source record to another master record in response to a score from the matching algorithm being greater than or equal to a selected first threshold value for a correspondence between the particular source record and the other master record; and
creating a new master record in response to the score from the matching algorithm being zero or less than a second threshold value for a correspondence between the particular source and the other master record and mapping the particular source to the new master record.

28. The method of claim 1, further comprising running a data matching algorithm in response to the source record not being matched to the master record, wherein the data matching algorithm is configured to compare information in the source record to information in at least one master record to determine if the source record can be mapped to the at least one master record.

29. The method of claim 28, further comprising the data matching algorithm scoring a result of the comparison of the information, the score comprising an indication of the probability that the source record can be mapped to the at least one master record.

* * * * *